United States Patent [19]

Jackson et al.

[11] 4,424,722
[45] Jan. 10, 1984

[54] RACK AND PINION DRIVE ARRANGEMENT

[75] Inventors: Eric A. Jackson; George M. Turner, both of Derby, England

[73] Assignee: Perard Engineering Ltd., Derbyshire, England

[21] Appl. No.: 225,141

[22] Filed: Jan. 14, 1981

[30] Foreign Application Priority Data

Jan. 18, 1980 [GB] United Kingdom ................. 8001770

[51] Int. Cl.³ ........................ F16H 1/04; F16H 55/12; F16H 1/20
[52] U.S. Cl. ........................................ 74/422; 74/415; 74/439
[58] Field of Search .................... 74/422, 424.6, 109, 74/89.17, 439, 440, 411, 415; 105/29 TL, 29 R; 104/165; 299/43, 42

[56] References Cited

U.S. PATENT DOCUMENTS

| | | | |
|---|---|---|---|
| 1,438,266 | 12/1922 | Schoberle | 105/29 R |
| 2,509,161 | 5/1950 | Meyers | 74/422 |
| 2,862,400 | 12/1958 | D'Angelo | 105/29 R |
| 2,920,501 | 1/1960 | Couch | 74/422 |
| 3,496,791 | 2/1970 | Gabriel | 74/411 |
| 3,926,067 | 12/1975 | Blanchard | 74/411 |
| 4,025,120 | 5/1977 | Balinov | 74/422 |
| 4,183,585 | 1/1980 | Brennan | 105/29 R |

FOREIGN PATENT DOCUMENTS

| | | | |
|---|---|---|---|
| 2547826 | 4/1976 | Fed. Rep. of Germany | 299/43 |
| 2552544 | 6/1977 | Fed. Rep. of Germany | 104/165 |
| 53-16278 | 2/1978 | Japan | 104/165 |
| 566931 | 7/1977 | U.S.S.R. | 299/43 |

Primary Examiner—Kenneth Dorner
Assistant Examiner—D. Wright
Attorney, Agent, or Firm—Jones & Askew

[57] ABSTRACT

The arrangement is especially intended for mining equipment for driving a winning machine 20 along a face conveyor 11, on which the machine rides. The conveyor sections carry corresponding rack sections 30 having formations 40 each comprising two laterally spaced teeth 40a,40b, defining a channel 41 therebetween. The pinion has a disc-shaped body 43 having apertures 45 loosely mounting bands 44 of the type provided in a round-link chain. The bands engage with the teeth and the loose-mounting allows slight vertical and horizontal articulation of the bands. This reduces wear, especially at the joints between rack sections.

15 Claims, 4 Drawing Figures

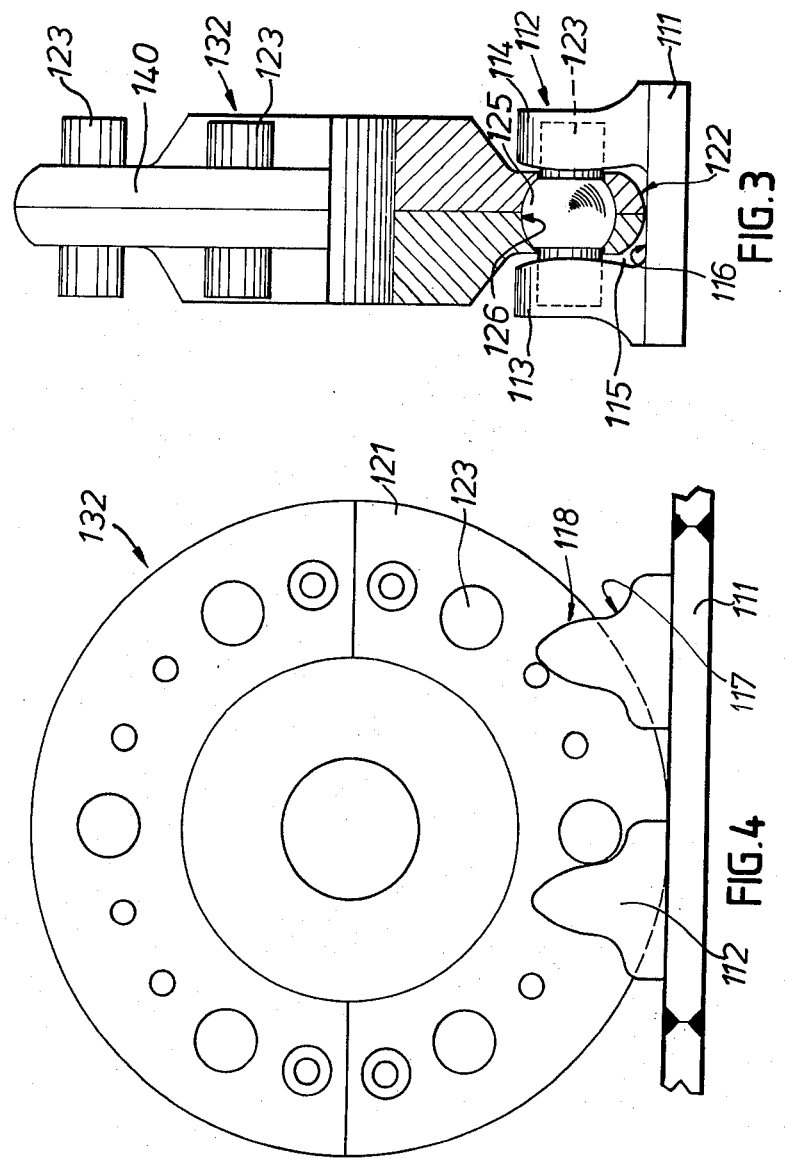

RACK AND PINION DRIVE ARRANGEMENT

This invention relates to a rack and pinion drive arrangement.

In longwall mining, a winning machine usually traverses a coal face riding on a face conveyor for removing cut coal from the face. In recent years, it has become commonplace to provide a rack along the face conveyor and the winning machine has a driven member which engages the rack to haul the machine along the conveyor. The conveyor is in sections connected together to permit slight articulation both horizontally and vertically. This is necessary, because of the uneveness of the floor and to permit progressive advancement of the conveyor. The rack, therefore, also has to be provided in sections corresponding to the conveyor sections. The driven member is either a chain or a sprocket.

A great deal of wear of the chain or sprocket and of the teeth, or other formations of the rack, occurs due to the snaking of the rack, both vertically and horizontally, since positive engagement is not always achieved. The present invention is concerned with providing a rack and pinion drive arrangement, especially for a winning machine, which avoids this problem.

In accordance with this invention, a rack and pinion drive arrangement is provided in which the pinion has formations engageable with formations of the rack and in which the formations of the pinion are movably mounted in the body thereof for articulation relative thereto.

Preferably, the formations of the pinion are capable of both horizontal and vertical articulation relative to the body of the pinion of about 5°.

Preferably, each formation of the rack comprises a pair of spaced teeth, such that a channel is defined along the rack between the teeth and the pinion has formations projecting to both opposite sides of the body of the pinion for engagement with both rows of teeth, the pinion body being received in said channel. The body of the pinion may define a wheel rim, which rides on the channel floor, or the rim may be spaced above the channel floor.

Each formation of the pinion may consist of a peg extending through the body of the pinion and having a part-spherical portion engaging with a complementary bearing surface in the body. Alternatively, each peg may be in the form of a link of a round-link chain loosely mounted in apertures in the body, so as to project to both sides thereof.

Reference is now made to the accompanying drawings, wherein:

FIG. 3 is an end elevation, partly in section, of a modified pinion and rack; and FIG. 4 is an enlarged side elevation of part of the modified rack and pinion.

Figure 1:
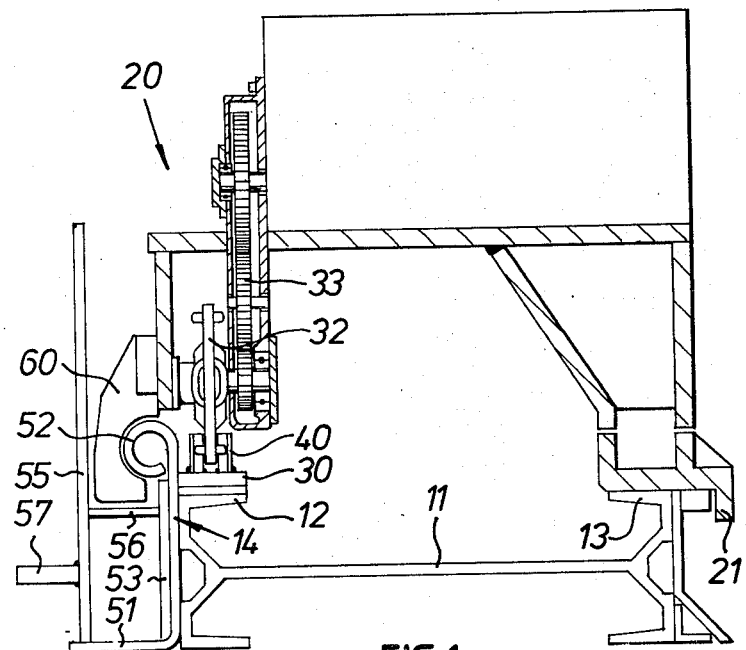
FIG. 1 is a sectional view of mining equipment including a face conveyor, goaf side equipment, and part of the body of a winning machine riding on the conveyor, the conveyor and machine being provided with a rack and pinion drive arrangement.

Referring to FIG. 1, there is shown a face conveyor 11 of conventional design having top flanges 12, 13. Secured to the goaf side of the conveyor is an L-section plate 14 having a rolled top 52 defining a rail. The bottom 51 of the L-shaped plate extends away from the conveyor to the goaf side and has welded thereto an upright spill plate 55 provided with a clevis rail 57 for attachment of self-advanceable hydraulically powered roof supports (not shown). a vertical support plate 53 is welded below the rail 52 and a bracing plate 56 is welded between the support plate 53 and the spill plate 55.

A winning machine 20 rides on top of the flanges 12, 13 of the conveyor 11. The machine has a dependent arm 21 at the face side to limit lateral movement of the machine on the conveyor, and, at the goaf side, the machine carries a shoe 60, which rides on the bracing plate 14 and is shaped to engage around the rolled rail 52. This "trapping" arrangement restricts both lateral and vertical movement of the machine.

The arrangement described above is conventional for use with haulage chain or other forms of drive. In this embodiment of the invention, a rack is secured along the top of the goaf side flange 12 of the conveyor 11. This rack comprises a base 30 and teeth 40. The machine mounts a pinion 32 which engages with the rack and is driven by a chain of gears 33. The gears are driven by the usual hydraulic motor (not shown) provided on the machine. Rotation of the pinion drives the machine along the conveyor.

The conveyor consists, as is conventional, of a series of sections connected to permit slight articulation and the rack comprises a series of sections each secured along the goaf side flange of a corresponding conveyor section. The rack, therefore, has adjacent sections at slight inclinations to each other both horizontally and vertically, usually up to 4°. This causes heavy wear of the pinion and/or the end teeth of the rack sections. Wear is considerably reduced in the arrangement described in the construction of the pinion.

Figure 2:
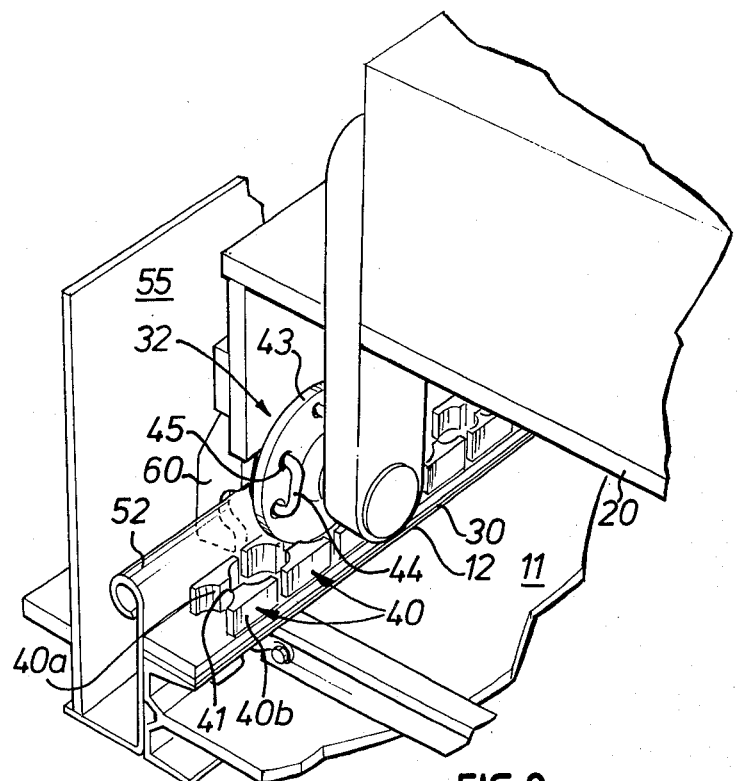
FIG. 2 is a perspective view of part of the mining equipment showing in greater detail the rack and pinion drive arrangement.

FIG. 2 shows that the rack comprises teeth 40 adapted to engage with the links of a round-link chain. The teeth are spaced longitudinally of the rack and each tooth 40 has two laterally spaced portions 40a, 40b, so that a channel 41 is defined between the tooth portions along the rack. This channel can receive vertical links of a round-link chain, whilst horizontal links are engaged with the teeth. A cleaning plough (not shown) can be carried by the machine and pass along the channel to clean out coal dust. A rack arrangement of this type is fully disclosed in our U.K. patent specifications nos. 1 500 904 and 1 500 905.

The pinion 32 comprises a disc 43 having apertures 45 spaced around a peripheral portion of the disc. These apertures mount rigid oval bands 44 in the form of links of a round-link type chain. The bands fit loosely in the apertures with the longitudinal ends passing through respective apertures. The bands are capable of slight movement in the plane of each band, i.e. parallel to the pinion axis, and also can tilt slightly towards the axis, so that a slight twisting through 3° to 7°, preferably about 5° of each band is possible relative to the disc 43. The bands are spaced according to the spacing of the teeth 40 of the rack.

By this arrangement, the bands can move to accommodate slight misalignment of the rack teeth as occurs at junctions of rack sections and may occur in other places, so that wear of both the rack and pinion is reduced. This embodiment is particularly advantageous, since it permits use of existing face equipment including the rack and only replacement of the pinion and its transmission system is required.

In the embodiment shown, the disc 43, which passes along the channel 41, is of sufficiently large diameter to run along the base 30 of the rack in contact therewith, so that less force is exerted on the rack teeth and the bands 44 of the pinion. The disc may, however, be out of contact with the base and this may be preferable in some cases, since a small build-up of coal dust in the channel would not then affect operation.

Referring now to FIGS. 3 and 4, a modified pinion 132 and rack tooth 112 are illustrated. The teeth again have two portions 113, 114 separated by a channel 115. and again the top surface of the base 111 in the channel serves as a bearing surface 116 for the outer peripheral edge of the pinion 132. In this case each tooth 112 has a concave surface 117 with an adjacent run-in convex surface 118 leading from the apex 119 of the tooth. The concave surface 112 supports a peg 123 of the pinion. Both opposite sides of each tooth are formed in this manner for engagement with the pinion moving in either direction along the rack.

The pinion again has a disc 121, which in this case has a convex rim 122 to engage the surface 116. Each peg 123 extends through the disc and has cylindrical projections to opposite sides of the disc for engaging the teeth of the rack. Below the projections, each peg has a part-spherical portion 125 which seats in a complementary bearing surface 126 in the disc. This permits limited universal movement of each peg in relation to the disc.

The disc may be split along its medium plane 140 to facilitate replacement of the pegs, the two halves of the disc being bolted together.

What is claimed is:

1. A rack and pinion drive arrangement, comprising:
a rack having a plurality of rack formations, each of said rack formations comprising a pair of spaced teeth defining a channel therebetween;
a pinion having a rotatable body received in said channel, and having a plurality of pinion formations movably mounted in said body for articulation relative thereto and engageable with said rack formations,
said body including a plurality of pairs of apertures for receiving said pinion formations,
each of said pinion formations being defined by a closed band extending through a corresponding pair of said apertures and projecting to opposite sides of said body,
each of said pinion formations being a loose fit in said apertures to provide both horizontal and vertical articulation relative to said body; and
drive means for rotating said pinion.

2. A rack and pinion drive arrangement, comprising:
a rack having a plurality of rack formations, each of said rack formations comprising a pair of spaced teeth defining a channel therebetween;
a pinion having a rotatable body received in said channel, and having a plurality of pinion formations movably mounted in said body for articulation relative thereto and engageable with said rack formations,
said body including a part-spherical bearing portion for receiving said pinion formations,
each of said pinion formations comprising a peg extending through said body and projecting to opposite sides of said body,
each of said pegs including a part-spherical portion for complementary engagement with said spherical bearing portion of said body to provide both horizontal and vertical articulation relative to said body; and
drive means for rotating said pinion.

3. The arrangement of claim 1, wherein the teeth of each two adjacent rack formations are shaped to engage simultaneously one of said bands.

4. The arrangement of claim 2, wherein each tooth of said rack includes a concave surface for supporting said peg and a convex surface between the apex of said tooth and said concave surface to provide a smooth lead-in for said peg.

5. The arrangement of claim 1, wherein said body of said pinion comprises a disc having a peripheral rim, and wherein said peripheral rim of said disc has rolling contact with said channel.

6. The arrangement of claim 2, wherein said body of said pinion comprises a disc having a peripheral rim, and wherein said peripheral rim of said disc has rolling contact with said channel.

7. Mining equipment, comprising:
a face conveyor having a plurality of relatively articulated sections capable of slight horizontal and vertical angular movement relative to each other;
a plurality of rack sections each fixed to a corresponding conveyor section, each of said rack sections being provided with a multiplicity of rack formations, each of said rack formations comprising a pair of teeth defining a channel therebetween; and
a winning machine which rides on said conveyor, said winning machine comprising a rotatable pinion, means for driving said pinion, and a plurality of pinion formations engageable with said rack formations,
said pinion comprising a body including a pair of apertures for receiving said pinion formations, said apertures being angularly spaced relative to the axis of rotation of said pinion,
each of said pinion formations comprising a continuous band member extending through said pinion body and being mounted therein for slight relative vertical and horizontal articulation so that said pinion formations can move to accommodate irregularities in the arrangement of said rack formations to reduce wear,
said band member extending through both apertures of a corresponding pair of said apertures to define a loop at each side of said pinion body, said band member being loosely fitted in said apertures to provide for said articulation, and
said rack formtions being shaped so that two adjacent rack formations define hollows for engaging simultaneously one of said bands with said band positioned between said two adjacent rack formations.

8. Mining equipment, comprising:
a face conveyor having a plurality of relatively articulated sections capable of slight horizontal and vertical angular movement relative to each other;
a plurality of rack sections each fixed to a corresponding conveyor section, each of said rack sections being provided with a multiplicity of rack formations, each of said rack formations comprising a pair of teeth defining a channel therebetween; and a winning machine which rides on said conveyor, said winning machine comprising a rotatable pinion, means for driving said pinion, and a plurality of pinion formations engageable with said rack formations, each of said pinion formations comprising a peg member extending through said pinion and being mounted therein for slight relative vertical and horizontal articulation so that said pinion formations can move to accommodate irregularities in the arrangement of said rack formations to reduce wear, said peg member comprising a part-spherical portion between its ends, and said pinion comprising a body including an aperture therethrough for receiving one of said pinion formations, said aperture defining a bearing surface complementary to and receiving said part-spherical portion of said peg member so as to provide for said articulation.

9. Mining equipment according to claim 7, wherein the degree of articulation is from about 3 degrees to about 7 degrees.

10. Mining equipment according to claim 8, wherein the degree of articulation is from about 3 degrees to about 7 degrees.

11. In a winning machine comprising a pinion rotatable about an axis and means for rotatably driving said pinion along a rack, the improvement wherein:

said pinion comprises a body and a plurality of formations on said pinion body, said formations being engageable with the rack for driving the winning machine along the rack, said pinion body defines a plurality of apertures spaced around said pinion axis, each of said formations is defined by a continuous band extending through a pair of adjacent ones of said apertures so as to form a loop at each side of said pinion body, and each said band is loosely fitted in said pair of said apertures to provide for slight vertical and horizontal articulation of said band relative to said pinion body.

12. In a winning machine comprising a pinion rotatable about an axis and means for rotatably driving said pinion along a rack, the improvement wherein:

said pinion comprises a body and a plurality of formations on said pinion body, said formations being engageable with the rack for driving the winning machine along the rack, said pinion body defines a plurality of apertures spaced around said pinion axis, each of said formations comprises a peg extending through a respective one of said apertures and projecting to opposite sides of said body, each of said pegs including a part-spherical portion between its ends, and said pinion body defines adjacent each said aperture a bearing surface complementary to and receiving said part-spherical portion of a respective one of said pegs to provide for slight vertical and horizontal articulation of said peg relative to said pinion body.

13. The improvement of claim 11, wherein the degree of said articulation is between about 3 degrees and about 7 degrees.

14. The improvement of claim 12, wherein the degree of said articulation is between about 3 degrees and about 7 degrees.

15. The improvement of claim 12, wherein said rack comprises a plurality of teeth, and wherein each tooth of said rack includes a concave surface for supporting said pegs of said pinion and a convex surface between the apex of said tooth and said concave surface to provide a smooth lead-in for said peg.

* * * * *